UNITED STATES PATENT OFFICE.

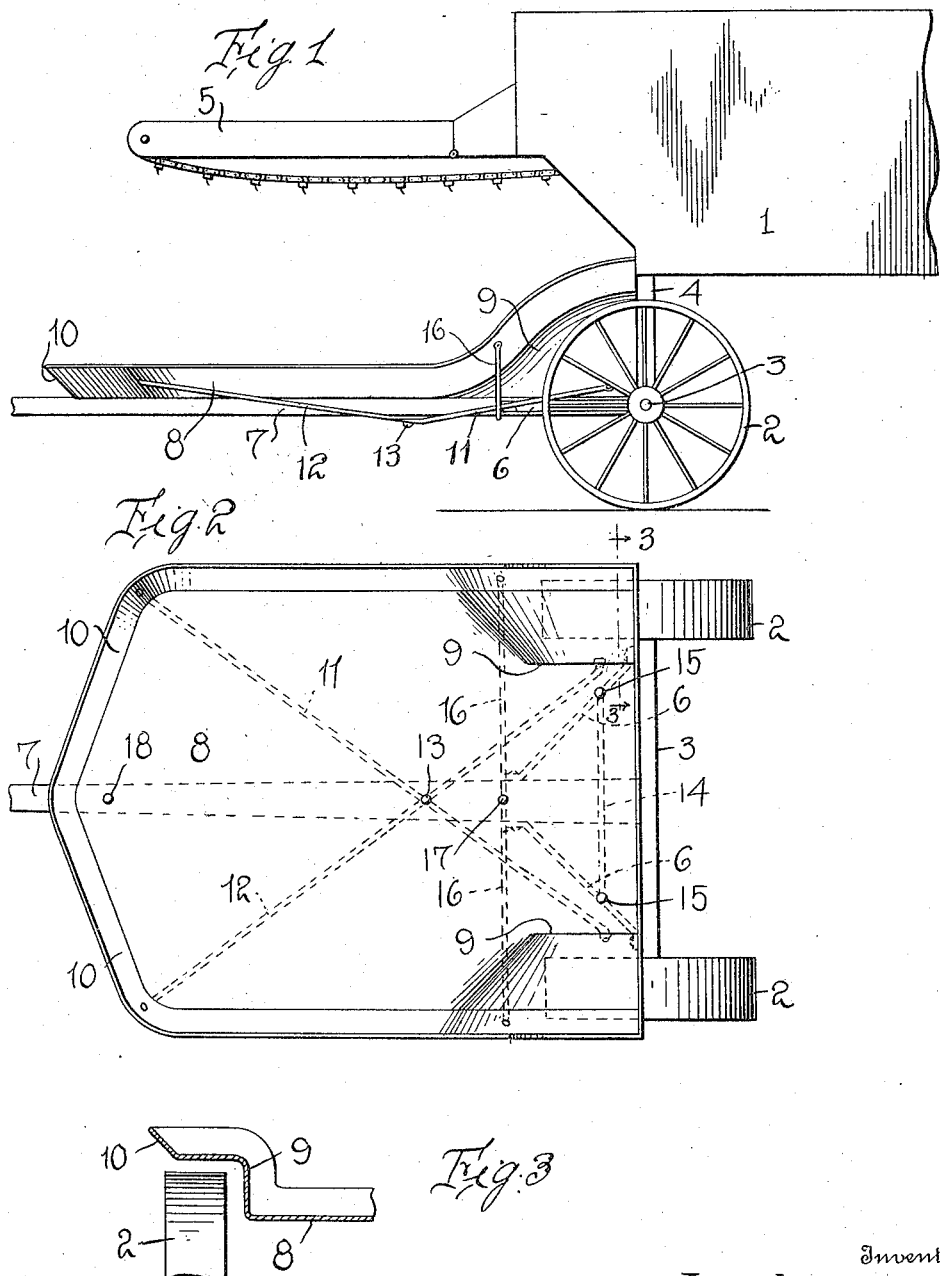

JOHN L. CLARK, OF PUTNEY, SOUTH DAKOTA.

THRESHING-MACHINE.

1,221,145. Specification of Letters Patent. Patented Apr. 3, 1917.

Application filed March 29, 1916. Serial No. 87,548.

*To all whom it may concern:*

Be it known that I, JOHN L. CLARK, a citizen of the United States, residing at Putney, in the county of Brown and State of South Dakota, have invented certain new and useful Improvements in Threshing-Machines, of which the following is a specification, reference being had to the accompanying drawings.

This invention relates to an attachment for threshing machines of that character wherein a feeder for the machine is located at one end of and over the tongue and truck of the running gear of the machine, the feeder usually consisting of an endless carrier for conveying the sheaves of wheat or the like to the threshing machine proper.

The principal object of the invention is to provide an attachment in the nature of a plate to be arranged upon the running gear of the machine below the feeder so as to catch any grain which might fall from the feeder and otherwise become lost.

Another object of the invention is to provide a plate of this character which will be so constructed as to cause the grain falling thereon to be deflected inwardly toward its center.

A further object resides in the provision of bracing or reinforcing means for the plate to render the same strong and durable.

With the foregoing and other objects in view, the invention consists in the novel features of construction and combination of parts as will be hereinafter more fully described, illustrated in the accompanying drawing, and claimed.

In the drawing,

Figure 1 is a fragmentary side elevation of a threshing machine with the improved attachment applied thereto.

Fig. 2 is a plan view showing the arrangement and manner of securing the plate relative to the running gear.

Fig. 3 is a section on the line 3—3 of Fig. 2.

Referring to the drawing by numerals, wherein I have illustrated the preferred embodiment of my invention, 1 designates a portion of a threshing machine which is supported by the truck wheels 2 through the medium of the axle 3 and bolster 4 in the usual manner. The threshing machine is of any well known construction and is provided with the usual feeder designated in its entirety at 5 which includes an endless carrier for conveying sheaves of wheat or other grain to the machine proper. The axle has also secured thereto in the ordinary manner as by means of the brace bars 6 a tongue 7.

The invention consists in the provision of a plate to be mounted upon the tongue of the threshing machine so as to lie directly beneath the feeder 5 to catch any grain which might fall from the feeder during the operation of placing the sheaves thereon and during travel of the sheaves from one end of the feeder to the threshing mechanism of the machine proper, the plate preferably being of a size to extend beyond the outer end of the conveyer so as to catch all grain which may fall either from the sides thereof or directly therethrough.

The plate is designated 8, and is preferably formed of sheet metal into substantially rectangular shape, being of a width to extend over the truck wheels 2 and of a length to project a considerable distance over the tongue 7. This plate adjacent each side and near its rear end is pressed upwardly as indicated at 9, so as to lie in spaced relation to the wheels 2 and permit of free rotation of the wheels upon the axle when the machine is being transported. As is shown, the edges of the plate are upturned at an angle as indicated at 10, so as to prevent any grain which falls therein from rolling off the same, the said angularly extending portion of the plate serving to cause all grain striking thereagainst to be deflected inwardly toward the center of the plate as will be understood.

A pair of diagonally extending braces 11 and 12 are provided which are crossed beneath the tongue and secured to the plate in any suitable manner. Each of these braces extend from a point adjacent one side edge of the plate near its front edge to a point adjacent the rear edge of the plate and near the point of juncture of the portion 9 with the plate proper. At the point of the crossing of these braces a bolt 13 is extended through the plate and through the braces and engaged with the tongue 7 to form a securing means for holding the plate in a desired portion upon the tongue.

A second brace extends transversely of the plate in parallelism to its rear edge and near the same, and is shaped to engage with the underfaces of the portions 9 and angular portions 10 of the plate. This brace is indicated at 14 and is secured to the plate and to the rods 6 in any suitable manner as by means of the bolts 15 which are passed through the plate, and the brace and through the braces 6 of the running gear.

A fourth brace 16 is provided which is arranged upon the underface of the plate between the point of crossing of the diagonal braces and the brace 14 being extended in parallelism with the brace 14 as is shown, this brace being also shaped to engage with the angular portions of the plate provided by the angular flange 10 and portion 9. This brace is also secured to the plate in any suitable manner and has a bolt 17 extending therethrough and through the plate and tongue to provide a further fastening means for the plate. The bolts 13, 15, and 17 coöperate with another bolt 18 which is passed through the plate near its front end and through the tongue to firmly and rigidly secure the same in place.

From the foregoing it is thought that the construction and operation of the attachment will be apparent. As the feeder 5 is operated and grain falls therefrom, it will be caught by the plate from where it may be collected at suitable intervals.

From the foregoing description taken in connection with the accompanying drawings, it is thought that the construction, operation and advantages of the improved attachment for threshing machines will be clearly understood and while I have herein shown and described one specific embodiment of my invention, I do not wish to be limited thereto except for such limitations as the claims may import.

I claim:

1. In combination with a support, a member mounted upon the support, diagonally disposed braces having their opposite extremities secured to the member, the intermediate portions of said braces underlying the support, and an anchoring member disposed through the support and through the crossed portions of the diagonal braces for securing said member to the support.

2. In combination with a support, a member mounted upon the support, diagonally disposed braces having their opposite extremities secured to the member, the intermediate portions of said braces underlying the support, an anchoring member disposed through the support and through the crossed portions of the diagonal braces for securing said member to the support, a transversely disposed brace having its opposite extremities secured to the member at opposite sides of the support and underlying the support, and a fastening member disposed through said transverse brace and the support for affording additional securing means for the member.

In testimony whereof I hereunto affix my signature in the presence of two witnesses.

JOHN L. CLARK.

Witnesses:
J. J. WARKENTIN,
CHAS. E. ADAMS.

Copies of this patent may be obtained for five cents each, by addressing the "Commissioner of Patents, Washington, D. C."